(12) United States Patent
Gullentops

(10) Patent No.: US 8,960,121 B2
(45) Date of Patent: Feb. 24, 2015

(54) DIGITAL SYSTEM FOR CREATING A FLEXOGRAPHIC PRINTMASTER

(75) Inventor: Chris Gullentops, Kessel-Lo (BE)

(73) Assignee: Agfa Graphics NV, Mortsel (BE)

(*) Notice: Subject to any disclaimer, the term of this patent is extended or adjusted under 35 U.S.C. 154(b) by 257 days.

(21) Appl. No.: 13/816,379

(22) PCT Filed: Aug. 8, 2011

(86) PCT No.: PCT/EP2011/063625
§ 371 (c)(1),
(2), (4) Date: Feb. 11, 2013

(87) PCT Pub. No.: WO2012/022650
PCT Pub. Date: Feb. 23, 2012

(65) Prior Publication Data
US 2013/0133572 A1      May 30, 2013

Related U.S. Application Data

(60) Provisional application No. 61/375,251, filed on Aug. 20, 2010.

(30) Foreign Application Priority Data

Aug. 20, 2010 (EP) .................................... 10173538

(51) Int. Cl.
*B05C 5/00* (2006.01)
*B41C 1/00* (2006.01)
(Continued)

(52) U.S. Cl.
CPC . *B41C 1/003* (2013.01); *B05C 5/00* (2013.01); *B41C 1/18* (2013.01); *B41J 11/002* (2013.01); *B41J 19/16* (2013.01); *B41C 1/1066* (2013.01)

USPC ................. 118/256; 118/58; 347/12; 347/20; 347/110; 347/171; 347/224

(58) Field of Classification Search
None
See application file for complete search history.

(56) References Cited

U.S. PATENT DOCUMENTS 4,992,890 A    2/1991  Pinard et al.
6,193,923 B1   2/2001  Leyden et al.
(Continued)

FOREIGN PATENT DOCUMENTS

EP    1 428 666 A1    6/2004
EP    2 199 065 A1    6/2010
(Continued)

OTHER PUBLICATIONS

Official Communication issued in International Patent Application No. PCT/EP2011/063625, mailed on Oct. 21, 2011.
(Continued)

*Primary Examiner* — Dah-Wei D Yuan
*Assistant Examiner* — Jethro M Pence
(74) *Attorney, Agent, or Firm* — Keating & Bennett, LLP

(57) ABSTRACT

A relief print master is created by a printhead that moves in a slow scan direction. The nozzles of the printhead jet droplets of a polymerisable liquid on a rotating drum. The different nozzles jet droplets simultaneously on different layers that have different diameters. As a result, the droplets jetted by different nozzles travel over different distances before landing. The effect of this is that the droplets undergo different position lag as they land on the different layers. By rotating the printhead in a plane that is orthogonal to the jetting direction this effect can be compensated for.

5 Claims, 5 Drawing Sheets

(51) Int. Cl.
*B41C 1/18* (2006.01)
*B41J 11/00* (2006.01)
*B41J 19/16* (2006.01)
*B41C 1/10* (2006.01)

(56) References Cited

U.S. PATENT DOCUMENTS

| | | | | |
|---|---|---|---|---|
| 6,295,926 | B1* | 10/2001 | Sodeyama et al. | 101/401.1 |
| 2002/0097315 | A1* | 7/2002 | Aroneo et al. | 347/215 |
| 2003/0056669 | A1* | 3/2003 | Miller et al. | 101/401.1 |
| 2003/0189617 | A1 | 10/2003 | Mott et al. | |
| 2004/0131778 | A1 | 7/2004 | Verhoest et al. | |
| 2004/0161704 | A1* | 8/2004 | Huang | 430/303 |
| 2004/0252174 | A1 | 12/2004 | Baxter et al. | |
| 2005/0046651 | A1 | 3/2005 | Askren et al. | |
| 2007/0257951 | A1* | 11/2007 | Silverbrook et al. | 347/12 |
| 2009/0197013 | A1 | 8/2009 | Gouch et al. | |
| 2010/0072181 | A1 | 3/2010 | Maschera et al. | |

FOREIGN PATENT DOCUMENTS

EP 2 199 066 A1 6/2010
WO 2012/080058 A1 6/2012

OTHER PUBLICATIONS

Gullentops, "System and Method for Digital Creation of a Print Master Using a Multiple Printhead Unit", U.S. Appl. No. 13/581,691, filed Aug. 29, 2012.

Gullentops, "System and Method for Digital Creation of a Print Master Using a Multiple Printhead Unit", U.S. Appl. No. 13/816,384, filed Feb. 11, 2013.

Gullentops, "System and Method for the Digital Creation of a Print Master by Means of a Liquid Droplet Deposition Appartus", U.S. Appl. No. 13/883,622, filed May 6, 2013.

\* cited by examiner

DIGITAL SYSTEM FOR CREATING A FLEXOGRAPHIC PRINTMASTER

CROSS-REFERENCE TO RELATED APPLICATIONS

This application is a 371 National Stage Application of PCT/EP2011/063625, filed Aug. 8, 2011. This application claims the benefit of U.S. Provisional Application No. 61/375,251, filed Aug. 20, 2010, which is incorporated by reference herein in its entirety. In addition, this application claims the benefit of European Application No. 10173538.9, filed Aug. 20, 2010, which is also incorporated by reference herein in its entirety.

BACKGROUND OF THE INVENTION

1. Field of the Invention

The invention deals with the field of three dimensional printing, more specifically the printing of relief features on a rotating cylindrical support using a fluid depositing apparatus such as an inkjet printhead. Even more specifically, the invention deals with the field of creating a flexographic print master on a rotating drum by a depositing printhead that moves in a slow scan direction and deposits curable liquid such as a UV-curable liquid.

2. Description of the Related Art

In flexographic printing or flexography a flexible cylindrical relief print master is used for transferring a fast drying ink from an anilox roller to a printable substrate. The print master can be a flexible plate that is mounted on a cylinder, or it can be a cylindrical sleeve.

The raised portions of the relief print master define the image features that are to be printed.

Because the flexographic print master has elastic properties, the process is particularly suitable for printing on a wide range of printable substrates including, for example, corrugated fiberboard, plastic films, or even metal sheets.

A traditional method for creating a print master uses a light sensitive polymerisable sheet that is exposed by a UV radiation source through a negative film or a negative mask layer ("LAMS"-system) that defines the image features. Under the influence of the UV radiation, the sheet will polymerize underneath the transparent portions of the film. The remaining portions are removed, and what remains is a positive relief print plate.

In the unpublished applications EP08172281.1 and EP08172280.3, both assigned to Agfa Graphics NV and having a priority date of 2008-12-19, a digital solution is presented for creating a relief print master using a fluid droplet depositing printhead.

The application EP08172280.3 teaches that a relief print master can be digitally represented by a stack of two-dimensional layers and discloses a method for calculating these two-dimensional layers.

The application EP08172281.1 teaches a method for spatially diffusing nozzle related artifacts in the three dimensions of the stack of two-dimensional layers.

Both applications also teach a composition of a fluid that can be used for printing a relief print master, and a method and apparatus for printing such a relief print master.

FIG. 1 shows an embodiment of such an apparatus 100. 140 is a rotating drum that is driven by a motor 110. A printhead 160 moves in a slow scan direction Y parallel with the axis of the drum at a linear velocity that is locked with the rotational speed X of the drum. The printhead jets droplets of a polymerisable fluid onto a removable sleeve 130 that is mounted on the drum 140. These droplets are gradually cured by a curing source 150 that moves along with the printhead and provides local curing. When the relief print master 130 has been printed, the curing source 170 provides an optional and final curing step that determines the final physical characteristics of the relief print master 120.

An example of a printhead is shown in FIG. 3. The printhead 300 has nozzles 310 that are arranged on a single axis 320 and that have a periodic nozzle pitch 330. The orifices of the nozzles are located in a plane that corresponds with the nozzle plate.

FIG. 2 demonstrates that, as the printhead moves from left to right in the direction Y, droplets 250 are jetted onto the sleeve 240, whereby the "leading" portion 211 of the printhead 210 prints droplets that belong to a layer 220 having a relatively smaller diameter, whereas the "trailing" portion 212 of the printhead 210 prints droplets on a layer 230 having a relatively larger diameter.

Because in the apparatus in FIGS. 1 and 2 the linear velocity of the printhead in the direction Y is locked with the rotational speed X of the cylindrical sleeve 130, 240, each nozzle of the printhead jets fluid along a spiral path on the rotating drum. This is illustrated in FIG. 4, where it is shown that fluid droplets ejected by nozzle 1 describe a spiral path 420 that has a pitch 410.

In FIG. 4, the pitch 410 of the spiral path 420 was selected to be exactly equal to the length of the nozzle pitch 430 of the printhead 440. In a more general preferred embodiment the pitch of the spiral path is an integer multiple "N" of the nozzle pitch. In such a case there are N interlaced spiral paths.

A prior art system such as the one depicted in FIG. 2 and FIG. 4 suffers from an unexpected problem.

The droplets that are ejected by the nozzles of the printhead 210, 440 have a finite velocity while they travel to their landing position. As a result it takes some time for them to reach their landing position on the rotating drum. The effect can be described as "landing position lag". This landing position lag—by itself—poses no problem. However, in the prior art system shown in FIG. 2, the nozzles near the leading edge of the printhead eject droplets that land on a layer of the print master having a relatively smaller diameter, whereas the nozzles near the trailing edge of the printhead eject droplets that land on a layer having a relatively larger diameter. The effect of this is that the droplets ejected by nozzles near the leading edge of the printhead be subject to more landing position lag compared with droplets ejected by nozzles near the trailing edge of the printhead. This results in a distortion of the three-dimensional grid that makes up the relief print master, since droplets that are intended to be stacked on top of each other in the different layers will be shifted relatively to each other. This weakens the matrix of droplets that make up the relief print master.

SUMMARY OF THE INVENTION

In order to overcome the problems described above, preferred embodiments of the invention reduce the geometrical distortion of the matrix of cured droplets that make up the relief print master and that results from the effects of landing position lag in a prior art system as the one shown in FIG. 2.

Preferred embodiments of the invention are realized by a system described below wherein the printhead is rotated in the plane that corresponds with its nozzle plate by an amount that reduces the effects of landing position lag.

Various specific preferred embodiments are also described below.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 2:
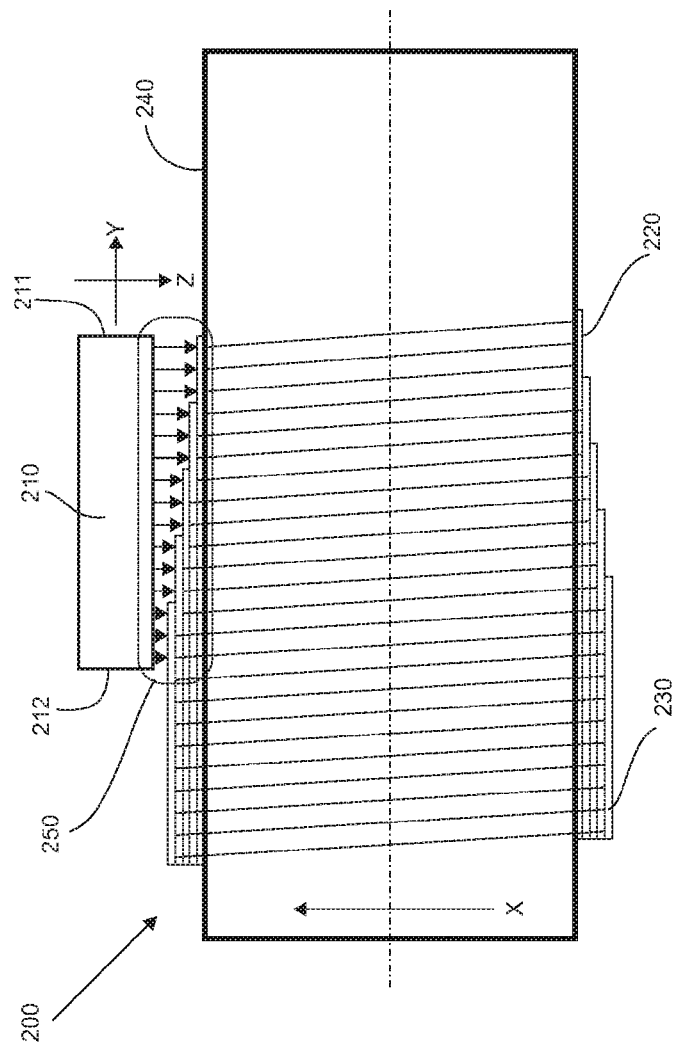
FIG. 2 shows a different view of an embodiment of an apparatus for printing a relief print master on a sleeve.
Figure 1:
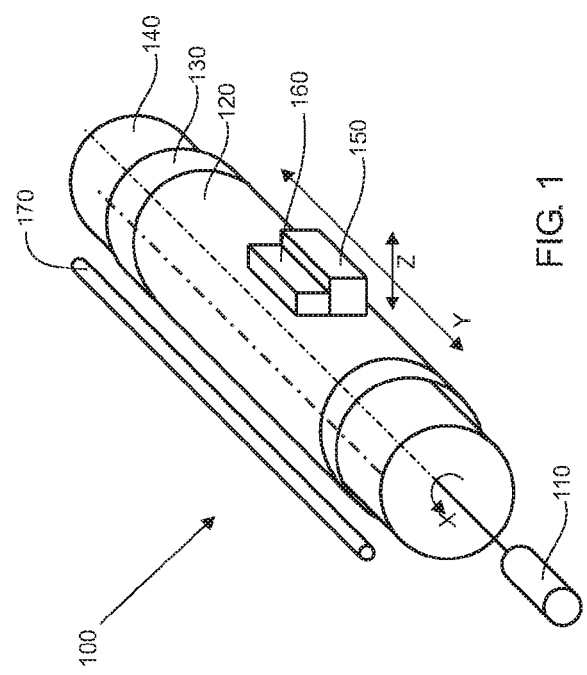
FIG. 1 shows an embodiment of an apparatus for printing a relief print master on a sleeve.
Figure 3:
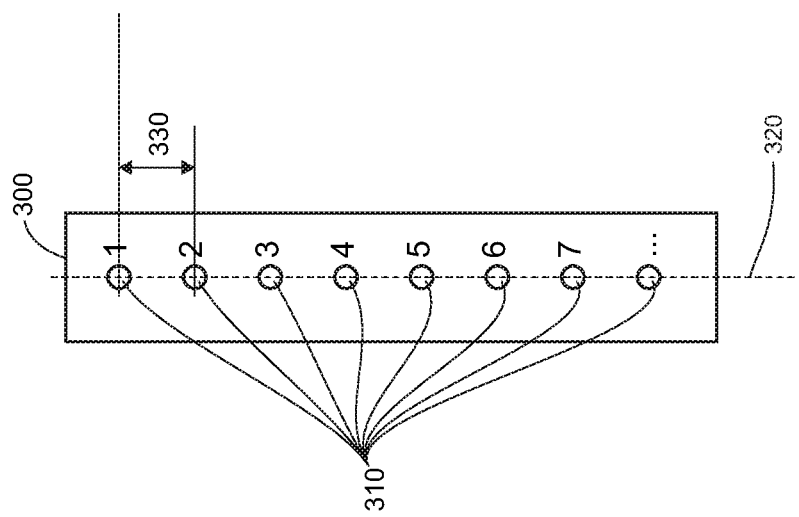
FIG. 3 shows a printhead with a single row of nozzles.
Figure 4:
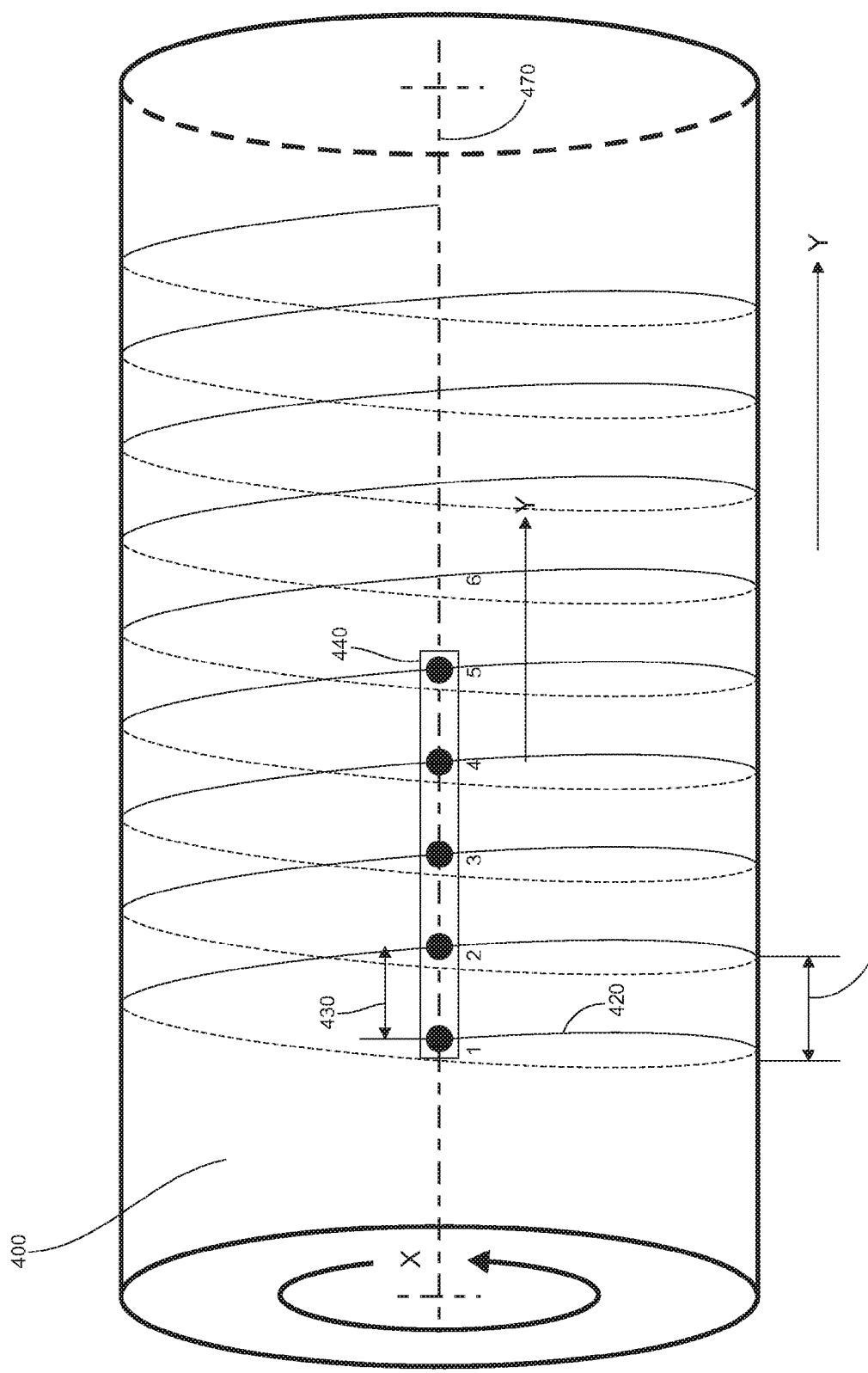
FIG. 4 shows a spiral path on which the fluid droplets ejected by the nozzles of a printhead as in FIG. 3 land.

FIG. 4 shows a prior art system that is suitable for creating a relief print master and that can serve as the basis for an improved system according to preferred embodiments of the current invention.

Figure 5:
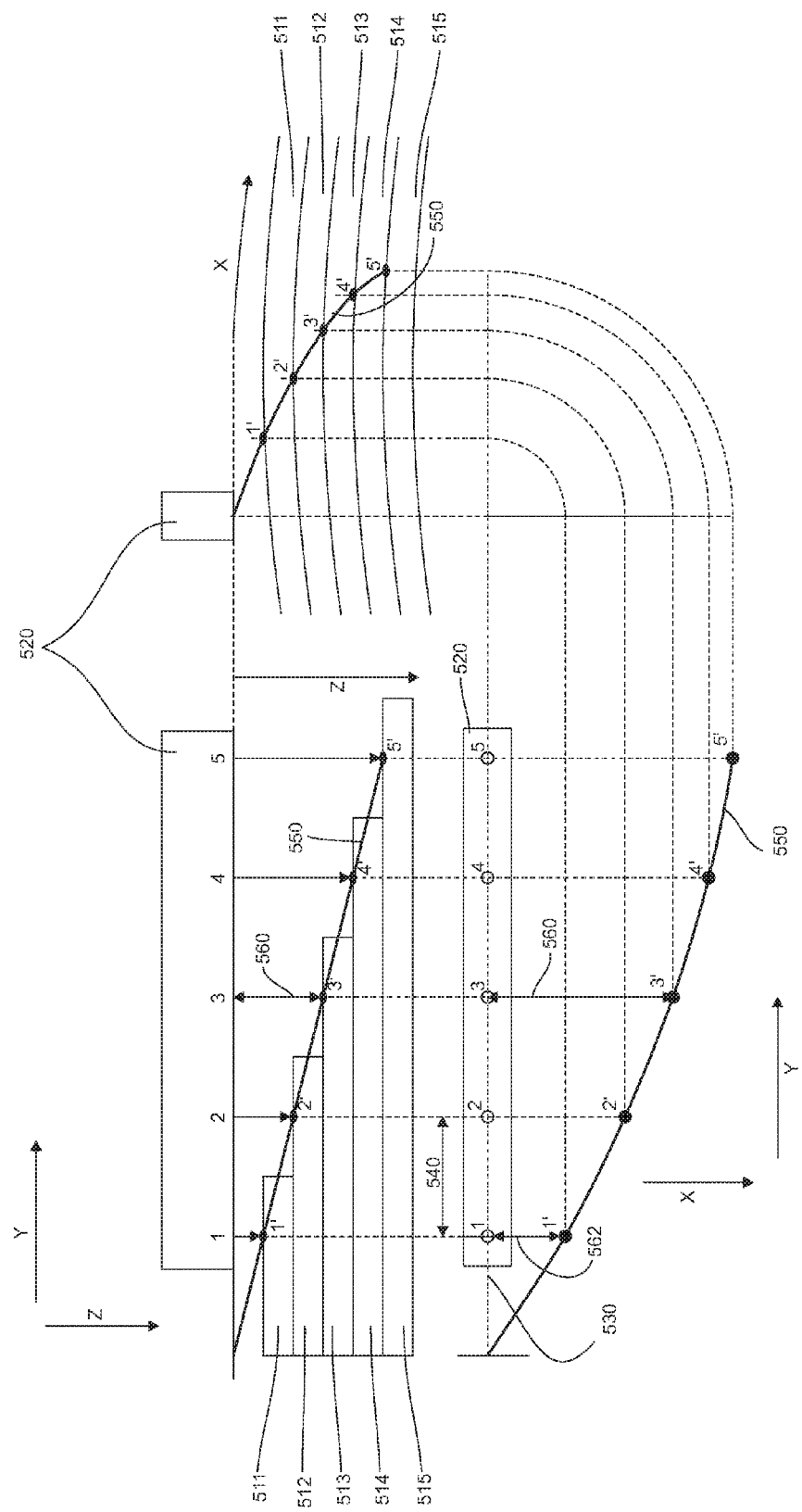
FIG. 5 shows projections in the Y-Z, X-Y and X-Z planes that demonstrate the effect of landing position lag in a prior art system.

FIG. 5 shows projections on three different orthogonal planes of the relevant portions of the prior art system in FIG. 4.

In FIG. 4 the cylindrical support 400 rotates at a frequency of NumberofRevolutionsperSecond along a central axis 470.

In FIGS. 4 and 5, a printhead unit 440, 520 has nozzles that are arranged on a nozzle row 530. The distance between the nozzle row 530 and the central axis of the rotating cylinder is referred to by the variable NozzlePlateDistance (nozzle plate distance $D_2$). In the prior art system shown in FIG. 4 and FIG. 5 the nozzle row 530 is parallel with the central axis 470 of the rotating cylindrical support 400.

Every nozzle of the printhead has an index number j that in FIG. 4 and FIG. 5 ranges from 1 to 5. The distance between two adjacent nozzles is the nozzle pitch, represented by the variable NozzlePitch (nozzle pitch distance $D_1$) and is indicated with the reference signs 430 (in FIG. 4) and 540 (in FIG. 5). In the remaining part of this document a nozzle having an index number j will be referred to as "nozzle[j]".

The Y dimension in FIG. 4 and FIG. 5 is parallel with the central axis 470 of the drum 400 (in FIG. 4). The Y direction corresponds with the movement of the printhead in the Y dimension and is indicated by the arrow in the drawings. The speed of the movement of the printhead 440, 520 in the Y-dimension is locked with the frequency of the rotating cylindrical drum support.

The X dimension in FIG. 4 and FIG. 5 indicates the direction in which a point on the surface of the rotating drum moves. Because in the context of the preferred embodiments of the current invention the diameter of the cylindrical support is significantly larger than the displacement of a point on the surface during the relevant time frame of the rotation of the cylindrical support, the X-dimension can be locally approximated by a straight line that is tangential to the surface of the drum and that is orthogonal with regard to the central axis of the cylindrical drum. A rendering of the X-dimension is indicated in the X-Z projection (on the right-hand side) of FIG. 5, where the layers 511, 512, 513, 514 and 515 have a nearly flat curvature. In the calculations that follow, the X-dimension is locally approximated by a straight line.

The Z direction is orthogonal to both the X and Y dimensions and indicates the height with regard to a reference surface in an X-Y plane. In FIG. 5 the nozzle plane, i.e. a fictitious plane in which the orifices of the nozzles are located serves as a reference plane.

In a more general preferred embodiment, a printhead unit according to the current invention can have any number of nozzles on a nozzle row higher than one. Also, in a more general preferred embodiment a printhead unit can optionally have multiple parallel nozzle rows that can be staggered, for example for increasing the resolution of the printhead unit compared with the resolution of the individual printheads. In that case, the multiple parallel rows are located in a plane that is parallel with a tangent plane of the rotating cylindrical support.

The nozzles 1, 2, 3, 4 and 5 of the printhead unit 520 eject droplets that land on the different layers 511, 512, 513, 514 and 515. The landing positions are indicated with the reference numbers 1', 2', 3', 4' and 5'.

The positions 1', 2', 3', 4' and 5' of the landed droplets can be connected by a curve 550.

The printhead 440, 520 has a leading edge portion that contains a nozzle that jets onto a layer having a relatively smaller diameter and a trailing edge portion that comprises a nozzle that jets onto a layer having a relatively (with regard to the layer on which the nozzle belonging to the leading edge jets) larger diameter. For example, in FIG. 5 a nozzle[4] which jets onto layer 514 could belong to a leading edge portion of the printhead, whereas nozzle[2] jetting onto layer 512 would belong to a trailing edge portion of the printhead.

PART 1 of the Mathematical Analysis

In FIG. 5 any given layer 511, 512, 513, 514 and 515 on the drum has a diameter represented by the variable Diameter[i] (diameter $DI_i$) in which i is an index number that refers to the layer. In the remaining part of the text, a layer having an index number i will be referred to as "layer[i]" (layer $L_i$).

The circumference of such a layer i is represented by the variable Circumference[i] and has a value equal to:

Circumference[i]=PI*Diameter[i]

The sleeve rotates in an X-direction at a frequency that is represented by the variable NumberofRevolutionsperSecond (revolutions per second frequency F). The circumferential speed of a given layer i of the sleeve is represented by the variable CircumferentialSpeed[i] and expresses the displacement Δx[i] of a surface point on the layer in the X dimension (x-dimension) per time unit.

CircumferentialSpeed[i]=Δx[i]/Δt

The value of CircumferentialSpeed[i] is equal to:

$$CircumferentialSpeed[i] = Circumference[i] *$$
$$NumberofRevolutionsperSecond$$
$$= PI * Diameter[i] *$$
$$NumberofRevolutionsperSecond$$

PART 2 of the Mathematical Analysis

A nozzle[j] ejects a droplet at a time point t1 with a speed equal to DropletVelocity (droplet velocity speed S) in the Z-dimension. The value of the speed DropletVelocity is a characteristic of the printhead unit and is expressed by:

DropletVelocity=dz/dt $\Delta z[i][j]$ is the distance between a nozzle[j] and the surface of a layer[i] on which the droplets ejected by nozzle[j] land. For example, in FIG. 5 $\Delta z[3][3]$ (indicated by the reference sign 560) is the distance between nozzle[3] and the layer[3] on which the droplets ejected by nozzle[3] land.

If it is assumed that the droplet velocity is constant over the trajectory $\Delta z[i][j]$, the time $\Delta t[i][j]$ it takes for the droplet to travel over the distance $\Delta z[i][j]$ is expressed by:

$$\Delta t[i][j]=\Delta z[i][j]/\text{DropletVelocity}$$

The droplet ejected by a nozzle[j] arrives at the surface of the layer[i] at a time t2 which is equal to:

$$t2=t1+\Delta z[i][j]/\text{DropletVelocity}$$

PART 3 of the Mathematical Analysis

Referring to FIG. 5, the x-coordinate of the position of nozzle[j] can be referred to as $x[j][0]$ (first coordinate ($N_1$, 0).

Similarly, $x[j][i]$ (second coordinate ($N_1$, $L_1$) refers to the x-coordinate of a droplet that was ejected by nozzle[j] and that has landed on layer[i].

The difference between the x-coordinate $x[j][0]$ of the nozzle[j] and the x-coordinate $x[j][i]$ is referred to as $\Delta x[j][i]$ (variable $\Delta x$) and is defined as:

$$\Delta x[j][i]=x[j][i]-x[j][0]$$

While a droplet ejected by a nozzle[j] travels from the orifice of the nozzle to the surface of a layer[i] of the drum, this surface has moved during a period $\Delta t[i][j]$ over a distance $\Delta x[i][j]$ in the x dimension that is equal to:

$$\Delta x[i][j]=\text{CircumferentialSpeed}[i]*\Delta t[i][j]$$

Substituting in the above expression the variables CircumferentialSpeed[i] and $\Delta t[i][j]$ leads to:

$$\Delta x[i][j]=\text{CircumferentialSpeed}[i]*\Delta z[i][i]/\text{DropletVelocity}$$

$$\Delta x[i][j]=PI*\text{Diameter}[i] *\text{NumberofRevolutionsperSecond}*\Delta z[i][j]/\text{DropletVelocity}$$

If the nozzle plate of a printhead is located at a distance having a value NozzlePlateDistance from the axis of the drum, and a layer[i] on the drum has a diameter equal to Diameter[i], then the distance $\Delta z[i][j]$ between a nozzle[j] and a layer[i] can be expressed as:

$$\Delta z[i][j]=\text{NozzlePlateDistance}-\text{Diameter}[i]/2$$

By substituting this expression for $\Delta z[i][j]$ into the expression for $\Delta x[i][j]$, the following new expression is obtained for $\Delta x[i][j]$:

$$\Delta x[i][j]=PI*\text{Diameter}[i]*\text{NumberofRevolutionsperSecond}*(\text{NozzlePlateDistance}-\text{Diameter}[i]/2)/\text{DropletVelocity}$$

The above expression provides the value for the x-coordinate of the landing position:

$$x[j][i]=x[j][0]+\Delta x[j][i]$$

$$x[j][i]=x[j][0]+PI*\text{Diameter}[i]*\text{NumberofRevolutionsperSecond}*(\text{NozzlePlateDistance}-\text{Diameter}[i]/2)/\text{DropletVelocity}$$

Defining a constant K having a value equal to:

$$K=PI*\text{NumberofRevolutionsperSecond}/\text{DropletVelocity}$$

optionally simplifies the expression for $\Delta x[i][j]$ to:

$$\Delta x[i][j]=K*\text{Diameter}[i]*(\text{NozzlePlateDistance}-\text{Diameter}[i]/2)$$

PART 4: Interpretation of the Mathematical Analysis

For a given nozzle[j], the expression for $\Delta x[i][j]$ is a quadratic function of the Diameter[i] of the layer[i] on which its ejected droplets land.

K is a constant of which the sign depends on the sign of variable NumberofRevolutionsperSecond. In what follows it is assumed that both the variables NumberofRevolutionsperSecond and hence K have a positive sign.

The structural relation between the drum and the printhead dictates that for an arbitrary layer the following constraint must be met:

$$\text{Diameter}[i]/2<=\text{NozzlePlateDistance}$$

The value of $\Delta x[i][j]$ becomes 0 in the special case that:

$$\text{Diameter}[i]/2=\text{NozzlePlateDistance}$$

As the value Diameter[i] of the diameter of a layer linearly decreases, the absolute value of $\Delta x[i][j]$ quadratically increases.

In a practical situation the variations of the variable Diameter[i] are small compared with the value of NozzlePlateDistance.

In that case the quadratic function can be locally approximated by a straight line. The slope of this straight line is expressed by the first derivative of the quadratic function:

$$\delta(\Delta x[i][j])/\delta(\text{Diameter}[i])=K*(\text{NozzlePlateDistance}-\text{Diameter}[i])$$

For layers nearby the nozzle plate, the variable Diameter[i] has a value that is approximately equal to 2*NozzlePlateDistance, the value of the first derivative is equal to:

$$\delta(\Delta x[i][j])/\delta(\text{Diameter}[i])=-K*\text{NozzlePlateDistance}$$

In that case the local expression for $\Delta x[i][j]$ becomes:

$$\Delta x[i][j] \approx K*\text{NozzlePlateDistance}*(2*\text{NozzlePlateDistance}-\text{Diameter}[i])$$

PART 5: Correction

Referring to FIG. 5, the landing position of a droplet ejected by the nozzle[1] on the layer[1] is shifted over a distance $\Delta x[1][1]$ (reference sign 562) in the opposite X direction, whereas the landing position of a droplet ejected by the nozzle[5] on the layer[5] is shifted over a distance $\Delta x[5][5]$ (reference sign 563) in the opposite X direction. The distances $\Delta x[1][1]$ and $\Delta x[5][5]$ can be expressed using the previous equations:

$$\Delta x[1][1]=K*\text{Diameter}[1](\text{NozzlePlateDistance}-\text{Diameter}[1]/2)$$

$$\Delta x[5][5]=K*\text{Diameter}[5](\text{NozzlePlateDistance}-\text{Diameter}[5]/2)$$

The difference $(\Delta x[5][5]-\Delta x[1][1])$ in the x dimension between the landing positions of droplets ejected by nozzle [1] and nozzle[5] is expressed by:

$$(\Delta x[5][5]-\Delta x[1][1])=K*\text{NozzlePlateDistance}*(\text{Diameter}[5]-\text{Diameter}[1])-K*(\text{Diameter}[5]^2-\text{Diameter}[1]^2)/2$$

All the values in the above expression are design parameters of the system so that the value of $(\Delta x[5][5]-\Delta x[1][1])$ can be easily evaluated.

Figure 6:
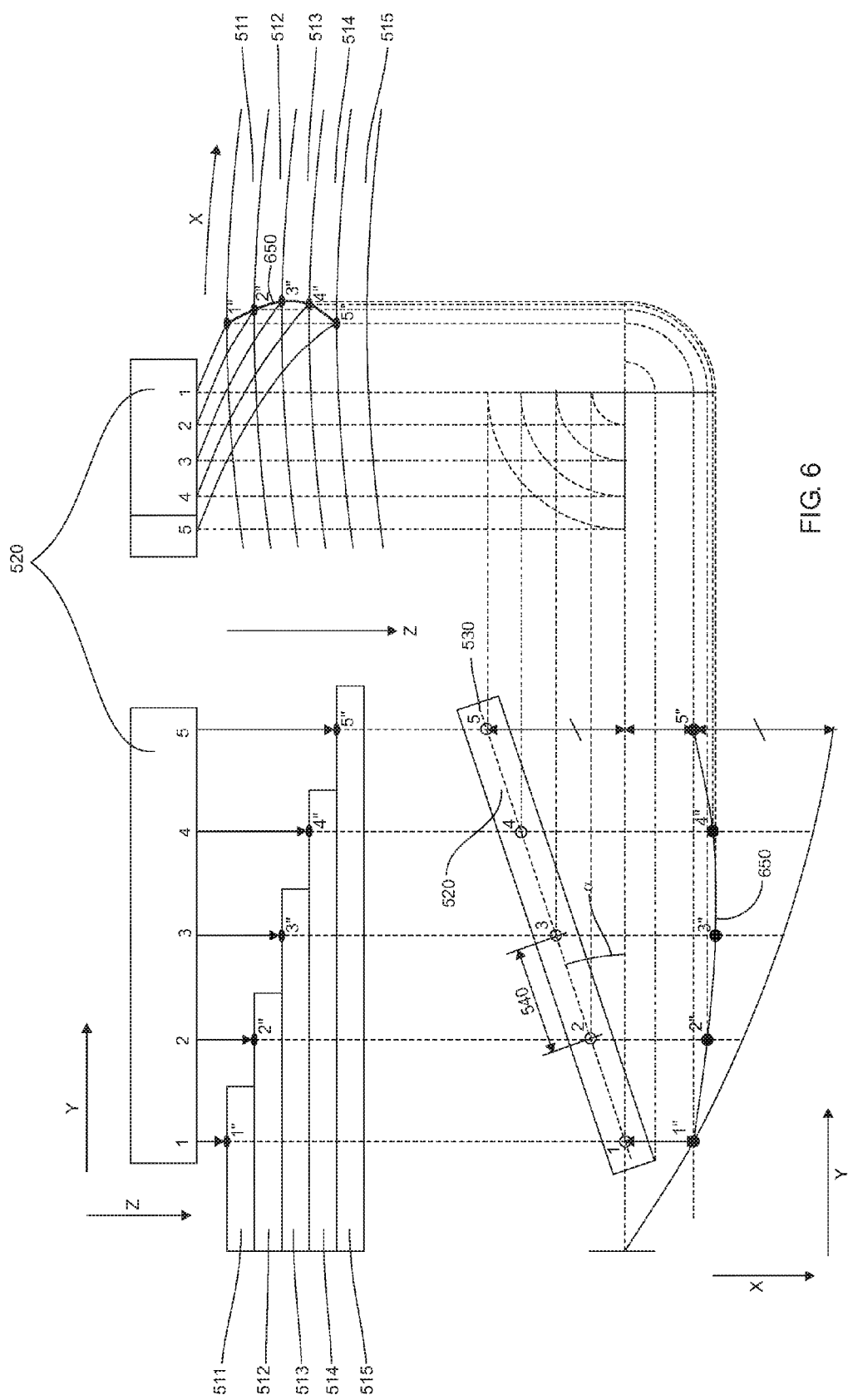
FIG. 6 shows projections in the Y-Z, X-Y and X-Z planes that demonstrate how the effect of the landing position lag is reduced by rotating the printhead in a XY-plane that is parallel to a plane that is tangential to the cylindrical sleeve.

In FIG. 6, the printhead 520 is rotated in the x-y plane by an angle $\alpha$ around a rotation center that corresponds with the position of the nozzle[1].

As a result of this rotation, the landing position of a droplet that is ejected by the nozzle[5] is moved over a distance having a value $\Delta x\text{RotatedHead}[5]$ in the x direction.

The displacement of ΔxRotatedHead[5] is expressed by $$\Delta x\text{RotatedHead}[5] = \sin(\alpha) * (5-1) * \text{NozzlePitch}$$

By selecting an appropriate value for a, it is possible to obtain that the difference (Δx[5][5]−Δx[1][1]) between the landing positions of droplets ejected by nozzle[1] and nozzle [5] in the X-dimension is exactly compensated by the displacement ΔxRotatedHead[n] that results from rotating the printhead with an angle α.

Mathematically, this translates into the following requirement:

$$(\Delta x[5][5] - \Delta x[1][1]) = \Delta x\text{RotatedHead}[5]$$

The value for α that should be selected to meet this condition is:

$$\alpha = a\sin\{(\Delta x[5][5] - \Delta[1][1])/((5-1)*\text{NozzlePitch})\}$$

As FIG. 6 shows, the rotation of the printhead with the angle α considerably flattens out the curve 650 that connects the landing positions of the ejected droplets.

FIG. 6 shows a specific case in which the printhead 520 is rotated so that the droplets ejected by nozzles 1 and 5 fall on the same line that is parallel with the Y axis. FIG. 6 is also a specific case in which there are as many layers on which droplets land as there are nozzles, whereby every nozzle ejects droplets on a different layer.

In a more general case a printhead has N nozzles having index numbers i (i=1, 2, 3, . . . N) and ejects droplets on M layers having index numbers j (j=1, 2, 3, . . . M).

The generalized formula for obtaining the angle α for rotating the printhead so that the droplets of two different nozzles, having index numbers j1 and j2 (1<=j1<j2<=N) and that jet on layers having index numbers i1 and i2 (1<=i1<=i2<=M), fall on a line parallel with the Y dimension is:

$$\alpha = a\sin\{(\Delta x[i2][j2] - \Delta x[i1][j1])/((j2-j1)*\text{NozzlePitch})\}$$

In which:

Δx[i2][j2] refers to the distance measured in the z-direction between the nozzle having an index number j2 and the layer having an index number i2 on which the droplets of said nozzle land;

Δx[i1][j1] refers to the distance measured in the z-direction between the nozzle having an index number j1 and the layer having an index number i1 on which the droplets of said nozzle land.

Using the above formula leads to a compensation that—under the given assumptions—will bring the landing positions of droplets ejected by the nozzle[j1] (first nozzle $N_1$) and nozzle[j2] (second nozzle $N_2$) on a line that is parallel with the Y dimension.

In the example shown in FIG. 6 the angle α was optimized so that the droplets ejected by the first nozzle and the last nozzle of the nozzle row would land on the same x coordinate. In a more general case nozzle[j1] belongs to a trailing portion of the printhead, whereas nozzle[j2] belongs to a leading portion of the printhead. The optimal selection of j1 and j2 can depend on what criterion is used for the "flattening" of the curve 650. Examples of such criterions are: minimizing the maximum deviation in the X-dimension between the landing positions of the droplets ejected by the nozzles of a printhead, or minimizing the root mean square value of the deviations. In general satisfactory results are obtained with a selection of j1=1 and j2=N.

In FIG. 6 the rotation of the printhead has a rotational center that corresponds with the X-Y position of nozzle[1]. In a more general preferred embodiment, preferred embodiments of the invention can be brought into practice using a different rotational center, such as for example the X-Y position of nozzle[3] or—even more in general, any other location within the nozzle plate of the printhead.

In the above mathematical analysis it was explicitly assumed that the speed of the droplets between the time they leave the nozzle plate and the time they land on a layer remains constant. This is only approximately true. In a real situation, the speed of a droplet ejected by a nozzle diminishes while it travels through space from the orifice towards its landing position. The effect of this is that the difference of the landing position along the X-dimension of droplets landing on layers with different diameters increases even more than what is predicted by the expression for Δx[j][i]. In that case compensation is necessary by rotating the printhead by an amount that is larger than the value of a that is predicted in the above formula for this angle. Consequently, a preferred embodiment of the current invention specifies the value for α using the following inequality:

$$\alpha = r*a\sin\{(\Delta x[i2][j2] - \Delta x[i1][j1])/((j2-j1)*\text{NozzlePitch})\}$$

in which: 1.0<=r

In another preferred embodiment α meets the following constraint:

$$\alpha = r*a\sin\{(\Delta x[i2][j2] - \Delta x[i1][j1])/((j2-j1)*\text{NozzlePitch})\}$$

In which: 1.0<=r<=2.0

In yet another preferred embodiment α meets the following constraint:

$$\alpha = r*a\sin\{(\Delta x[i2][j2] - \Delta x[i1][j1])/((j2-j1)*\text{NozzlePitch})\}$$

In which: 1.0<=r<=1.1

There may be instances that it is not necessary or even desirable to rotate the printhead by an amount that achieves maximum compensation for the x coordinate of the landing positions of droplets ejected by nozzles on different layers.

In one preferred embodiment the rotation by the angle α meets the following constraint:

$$\alpha = r*a\sin\{(\Delta x[i2][j2] - \Delta x[i1][j1])/((j2-j1)*\text{NozzlePitch})\}$$

In which: 0.1<=r<=1.0

In another preferred embodiment the rotation by the angle α meets the following constraint:

$$\alpha = r*a\sin\{(\Delta x[i2][j2] - \Delta x[i1][j1])/((j2-j1)*\text{NozzlePitch})\}$$

In which: 0.5<=r<=1.0

In yet another preferred embodiment the rotation by the angle α meets the following constraint:

$$\alpha = r*a\sin\{(\Delta x[i2][j2] - \Delta x[i1][j1])/((j2-j1)*\text{NozzlePitch})\}$$

In which: 0.9<=r<=1.0

Thus, a system for preparing a cylindrical relief object includes:

a cylindrical support having a central axis and rotating at a revolutions per second frequency F, a tangent line along the cylindrical support that is orthogonal to the central axis defining an x-dimension;

a fluid ejecting printhead including a row of nozzles including orifices in a nozzle plate, two adjacent nozzles of the row of nozzles being spaced at a nozzle pitch distance $D_1$, the row of nozzles having a nozzle plate distance $D_2$ from the central axis of the cylindrical support, the nozzles ejecting fluid droplets at a droplet velocity speed S towards the cylindrical support, the printhead moving parallel to the central axis of the cylindrical support at a speed that is locked to a frequency of the rotating cylindrical support; and a curing source; wherein the printhead includes a leading edge portion including a first nozzle $N_1$ ejecting fluid droplets on a first layer $L_1$, the first layer having a first diameter $DI_1$, a radial line connecting the first nozzle $N_1$ with the central axis defining a first coordinate $(N_1, 0)$ along the x-dimension;

a radial line that connects a landing position on the first layer $L_1$ of a droplet ejected by the first nozzle $N_1$ with the central axis defining a second coordinate $(N_1, L_1)$ along the x-dimension that is equal to the following equation:

$$(N_1,0)+PI*DI_1*F*(D_2-DI_1)/2)/S;$$

a difference between $(N_1, 0)$ and $(N_1, L_1)$ defining a first variable $\Delta x_1$ that is equal to $(N_1, L_1)-(N_1, 0)$;

the printhead includes a trailing edge portion including a second nozzle $N_2$ ejecting fluid droplets on a second layer $L_2$, the second layer $L_2$ having a second diameter $DI_2$ that is larger than the first diameter $D_1$, a radial line connecting the second nozzle $N_2$ with the central axis defining a third coordinate $(N_2, 0)$ along the x-dimension;

a radial line that connects a landing position on the second layer $L_2$ of a droplet ejected by the second nozzle $N_2$ with the central axis defining a fourth coordinate $(N_2, L_2)$ that is equal to the following equation:

$$(N_2,0)+PI*DI_2*F*(D_2-DI_2/2)/S;$$

a difference between $(N_2, 0)$ and $(N_2, L_2)$ defining a second variable $\Delta x_2$ that is equal to $(N_2, L_2)-(N_2, 0)$;

the nozzle plate in which the row of nozzles is located is rotated by an amount equal to the following equation:

$$r*a \sin [(\Delta x_2-\Delta x_1)-((N_2-N_1)*D_1],$$

in a plane that is parallel to a tangent plane of the cylindrical support, with regard to a direction of the central axis of the cylindrical support; and $$r>0.1.$$

Having explained the preferred embodiments of the invention in the context of preparing a relief print master, it should be clear to the person skilled in the art that the same inventive concepts can be used for creating other three-dimensional objects on a cylindrical drum than a relief print master for flexography. In general, any relief object that fits on a cylindrical drum and that can be printed using curable liquid can benefit from using the invention.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. A system for preparing a cylindrical relief object, the system comprising:

a cylindrical support having a central axis and rotating at a revolutions per second frequency F, a tangent line along the cylindrical support that is orthogonal to the central axis defining an x-dimension;

a fluid ejecting printhead including a row of nozzles including orifices in a nozzle plate, two adjacent nozzles of the row of nozzles being spaced at a nozzle pitch distance $D_1$, the row of nozzles having a nozzle plate distance $D_2$ from the central axis of the cylindrical support, the nozzles ejecting fluid droplets at a droplet velocity speed S towards the cylindrical support, the printhead moving parallel to the central axis of the cylindrical support at a speed that is locked to a frequency of the rotating cylindrical support; and a curing source; wherein the printhead includes a leading edge portion including a first nozzle $N_1$ ejecting fluid droplets on a first layer $L_1$, the first layer having a first diameter $DI_1$, a radial line connecting the first nozzle $N_1$ with the central axis defining a first coordinate $(N_1, 0)$ along the x-dimension;

a radial line that connects a landing position on the first layer $L_1$ of a droplet ejected by the first nozzle $N_1$ with the central axis defining a second coordinate $(N_1, L_1)$ along the x-dimension that is equal to the following equation:

$$(N_1,0)+PI*DI_1*F*(D_2-DI_1)/2)/S;$$

a difference between $(N_1, 0)$ and $(N_1, L_1)$ defining a first variable $\Delta x_1$ that is equal to $(N_1, L_1)-(N_1, 0)$;

the printhead includes a trailing edge portion including a second nozzle $N_2$ ejecting fluid droplets on a second layer $L_2$, the second layer $L_2$ having a second diameter $DI_2$ that is larger than the first diameter $D_1$, a radial line connecting the second nozzle $N_2$ with the central axis defining a third coordinate $(N_2, 0)$ along the x-dimension;

a radial line that connects a landing position on the second layer $L_2$ of a droplet ejected by the second nozzle $N_2$ with the central axis defining a fourth coordinate $(N_2, L_2)$ that is equal to the following equation:

$$(N_2,0)+PI*DI_2*F*(D_2-DI_2/2)/S;$$

a difference between $(N_2, 0)$ and $(N_2, L_2)$ defining a second variable $\Delta x_2$ that is equal to $(N_2, L_2)-(N_2, 0)$;

the nozzle plate in which the row of nozzles is located is rotated by an amount equal to the following equation:

$$r*a \sin [(\Delta x_2-\Delta x_1)-((N_2-N_1)*D_1],$$

in a plane that is parallel to a tangent plane of the cylindrical support, with regard to a direction of the central axis of the cylindrical support; and $r>0.1.$ 2. The system according to claim 1, wherein $0.5<r<2.0$.

3. The system according to claim 2, wherein $0.9<r<1.1$.

4. The system according to claim 1, wherein the relief object is a relief print master.

5. The system according to claim 4, wherein the relief print master is a flexographic print master.

* * * * *